United States Patent
McAndrews

(10) Patent No.: US 6,476,583 B2
(45) Date of Patent: Nov. 5, 2002

(54) AUTOMATIC BATTERY CHARGING SYSTEM FOR A BATTERY BACK-UP DC POWER SUPPLY

(75) Inventor: Joseph M. McAndrews, Freeport, NY (US)

(73) Assignee: Jomahip, LLC, Derby, CT (US)

( * ) Notice: Subject to any disclaimer, the term of this patent is extended or adjusted under 35 U.S.C. 154(b) by 0 days.

(21) Appl. No.: 09/909,559

(22) Filed: Jul. 20, 2001

(65) Prior Publication Data

US 2002/0014880 A1 Feb. 7, 2002

Related U.S. Application Data

(60) Provisional application No. 60/219,825, filed on Jul. 21, 2000.

(51) Int. Cl.$^7$ .......... H01M 10/44; H01M 10/46
(52) U.S. Cl. .......... 320/119; 320/128
(58) Field of Search .......... 320/112, 116, 320/118, 119, 120, 121, 128, 137

(56) References Cited

U.S. PATENT DOCUMENTS

| | | |
|---|---|---|
| 5,160,851 A | 11/1992 | McAndrews |
| 5,250,904 A | 10/1993 | Salander et al. |
| 5,777,454 A | 7/1998 | McAndrews et al. |

*Primary Examiner*—Edward H. Tso
(74) *Attorney, Agent, or Firm*—St. Onge Steward Johnston & Reens, LLC

(57) ABSTRACT

An automatic back-up battery management system utilizing primary DC power for telephone switching equipment, communications equipment, computer equipment or other loads.

29 Claims, 3 Drawing Sheets

AUTOMATIC BATTERY CHARGING SYSTEM FOR A BATTERY BACK-UP DC POWER SUPPLY

This is a continuation of provisional patent application No. 60/219,825, filed Jul. 21, 2000.

FIELD OF THE INVENTION

The present invention relates to a back-up battery management system for use with a primary DC power supply for telephone switching equipment or other loads, such as communication and computer equipment. In many other applications, the need for an uninterrupted source of DC power is critical.

BACKGROUND OF THE INVENTION

To avoid any interruption or outage in power service, it is common practice to employ a battery back-up for the primary DC source. Back-up battery systems typically include strings of batteries or cells connected in parallel with the primary DC source and the load. In the event of a drop in the load bus voltage below a predetermined threshold, the back-up battery supplants or supplements the primary source of DC power. Back-up battery systems are designed to replace the primary DC power source for a predetermined period of time within which resumption of primary power is expected to occur.

In conventional back-up battery systems, the nominal system load bus voltage has typically been dictated by battery characteristics. For example, in a telephone switching plant, back-up batteries are commonly employed which have a design cell voltage of 2.25 volts for optimum health of the battery cell. Twenty-four cells are typically combined in a string resulting in a nominal load bus voltage of approximately −54 volts. A bank of strings supplies the necessary back-up DC power.

As the back-up batteries are placed across the load, the full 54 volts of system DC voltage are placed across the battery string. This design architecture of a typical back-up battery system presents a number of potential problems. Certain batteries, due to their electrochemical constitution, will draw more current than other batteries. All batteries, as they age, will experience increasing internal resistance and will draw more charging current from the main DC supply.

About a decade ago, a new type of lead acid battery was introduced into the marketplace. The battery is sealed, and allegedly requires no maintenance. In this type of battery, oxygen and hydrogen produced during electrochemical reactions in the battery recombine to maintain an aqueous liquid electrolyte at a constant level within the cell. As a result, these batteries have only a small amount of liquid electrolyte. These batteries have become known as "valve regulated" or "recombinant" or "electrolyte-starved" batteries.

This type of lead acid battery (hereinafter termed "valve regulated lead acid" or "VRLA" batteries) has often failed well before their design life, which is typically 10 years.

A particular battery may, for various reasons not clearly understood, begin to take on more amperage to maintain its charge. The increased charging current will elevate the temperature of the battery. The chemical recombination of the oxygen and hydrogen gases also creates heat. As the internal battery temperature increases, the current demand increases disproportionately. For every 10 degrees centigrade of increase in the battery's internal temperature, the battery demand for current doubles. A battery in this condition will have one of two failure modes, the most damaging being "thermal runaway." Thermal runaway may lead to an explosion of the battery, with likely destruction or severe damage to any nearby equipment. Alternatively, the battery may experience a "melt down" and produce noxious gases that also are apt to damage or destroy neighboring equipment. The rectified AC source provided in typical telephone switching plants has more than ample capacity to supply any one or more batteries demanding abnormal charging current. This, together with paralleled battery strings, encourages the previously described thermal runaway or meltdown failures.

With the advent of fiber optic signal distribution, switching equipment has been decentralized, introducing a need for DC power supplies in unattended satellite installations distributed throughout the territory served. In these unattended installations, the equipment is often closely packed, leading to hostile thermal operating conditions for the equipment and increased occurrences of thermally induced failures. In less severe conditions, the placement of the back-up batteries directly across the load is apt to result in dry-out (loss of electrolyte), positive grid corrosion, and other problems which may lead to premature battery failure and/or below normal power performance.

Back-up battery systems must be monitored to determine the health and capacity of the batteries. The need to perform battery tests is particularly troublesome in systems that require the supply of an uninterrupted source of DC power. Testing of the vital statistics of a battery affecting output capacity, predicted life, etc. is presently done by taking a battery string off-line and testing it in one of two ways. The test procedure recommended by battery manufacturers as being the most reliable, is to discharge the battery into a load while measuring the response of the battery. The ability of a battery or battery string to hold a predetermined current level for a predetermined time is a reliable measure of the health and capacity of the battery. However, such discharge tests in the field require experienced personnel and are difficult and costly. Further, conventional battery testing, requiring the batteries to be taken off-line, suffers a loss of standby battery protection for the telephone plant or other equipment being supplied while the tested batteries are off-line.

To avoid the cost and inconvenience of a discharge test, it is commonplace to employ special field test equipment that tests for battery resistance, impedance, inductance and other parameters and characteristics without discharging the battery. See U.S. Pat. No. 5,250,904. However, as noted, tests that do not involve discharging the battery are apt to be less reliable.

SUMMARY OF THE INVENTION

U.S. Pat. No. 5,160,851 discloses a back-up battery system for telephone central office switching equipment. The back-up battery system includes that when the batteries are switched in circuit across the load, the cumulative battery voltage exceeds a predetermined load voltage for a selected period of time. A converter down converts the over voltage that results from switching extra cells across the load. The converter, a sensor for sensing the system discharge bus voltage and a switch may be formed as a single unit using MOSFET technology. One or more rechargeable batteries have cells floated at a given float voltage. A fail-safe contact switch may also be provided to parallel the MOS-FET switch and be operated in the event of MOS-FET failure.

Also, U.S. Pat. No. 5,777,454 discloses a back-up battery management system for use in a DC power supply system for use with telephone switching equipment or loads of other types. The disclosed battery management system is particularly adapted for use with batteries of the valve regulated lead acid type. It can also find utility with older "flooded" lead acid type batteries and batteries of other types.

The disclosed invention also provided a back-up battery management system for a battery backed-up primary DC power supply that permitted the back-up batteries to be maintained on-line at all times. The back-up battery management system also included means for charging the batteries with a predetermined level of substantially constant current while isolating the batteries from the system load bus. The charging current is substantially constant at a given time and for a given condition of the battery.

The invention further disclosed that a control system is provided which monitors and controls all significant conditions and parameters within the back-up battery management system to maintain the battery system at a float charge during normal operation.

The present invention (ABC System) also concerns a back-up battery management system for use in a DC power supply for use with telephone switching equipment and loads of other types. However, the methods used to isolate the batteries from the load bus and administer different levels of charging current into the batteries differ substantially from the previously disclosed inventions by the inventor. These differences will become apparent when the circuitry is described and the claims are put forth.

The invention and its particular features and advantages will become more apparent from the following detailed description considered with reference to the accompanying drawings.

DETAILED DESCRIPTION OF THE DRAWINGS

Figure 1:
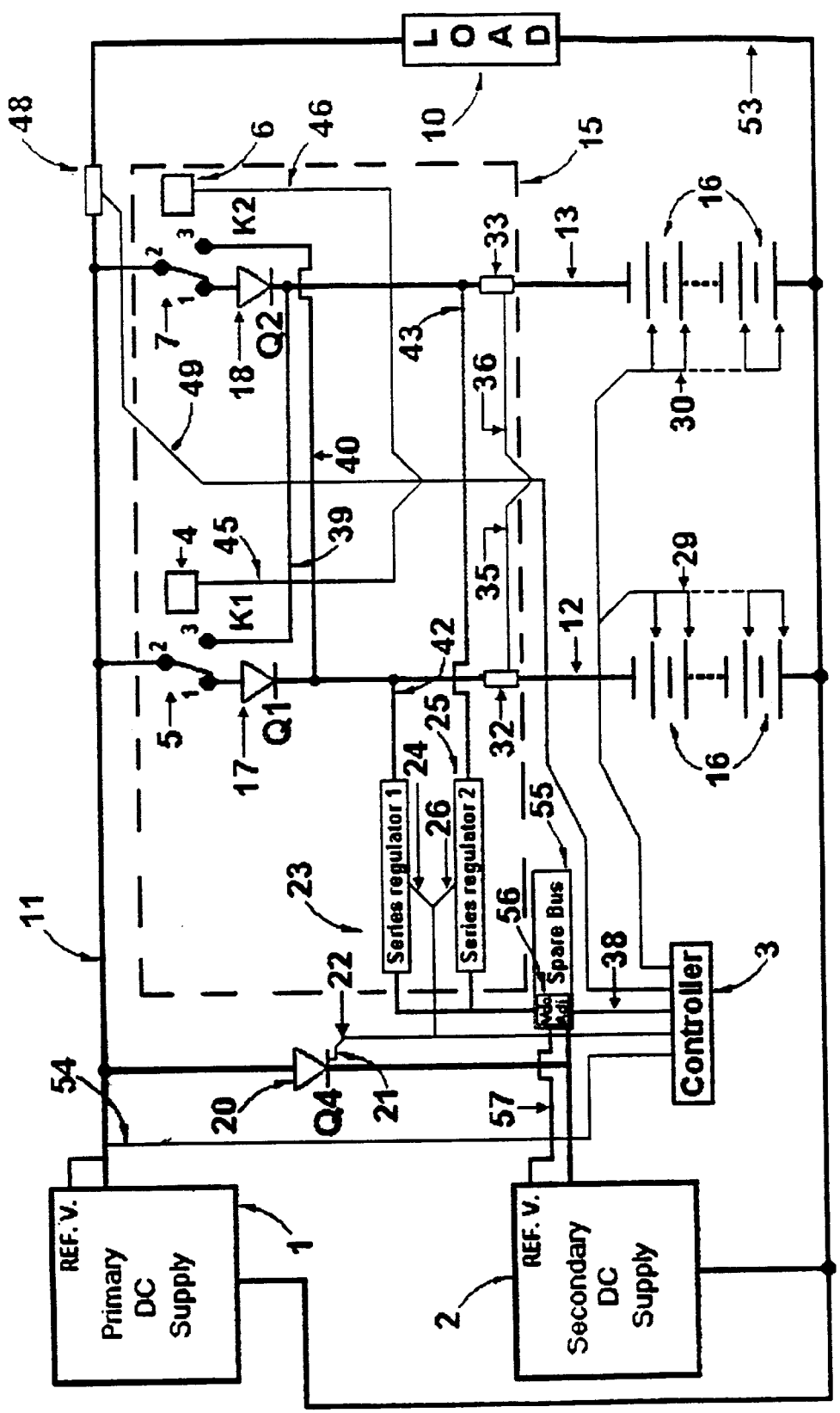
FIG. 1 is a schematic block diagram of the Automatic Battery Charging (ABC) System.

FIG. 1 shows the preferred embodiment of the (ABC System) invention supplying charging power for the battery strings 12 and 13 via a "Spare Bus" DC power source. The "Spare Bus" DC power source is comprised of a Secondary DC power source 2 providing power to a Spare bus 55. Included is voltage adjust circuitry 56, a feedback connection 57 between the Secondary DC power source 2 and the voltage adjust circuitry 56 and finally by control signals via 38 from a Controller 3.

Figure 2:
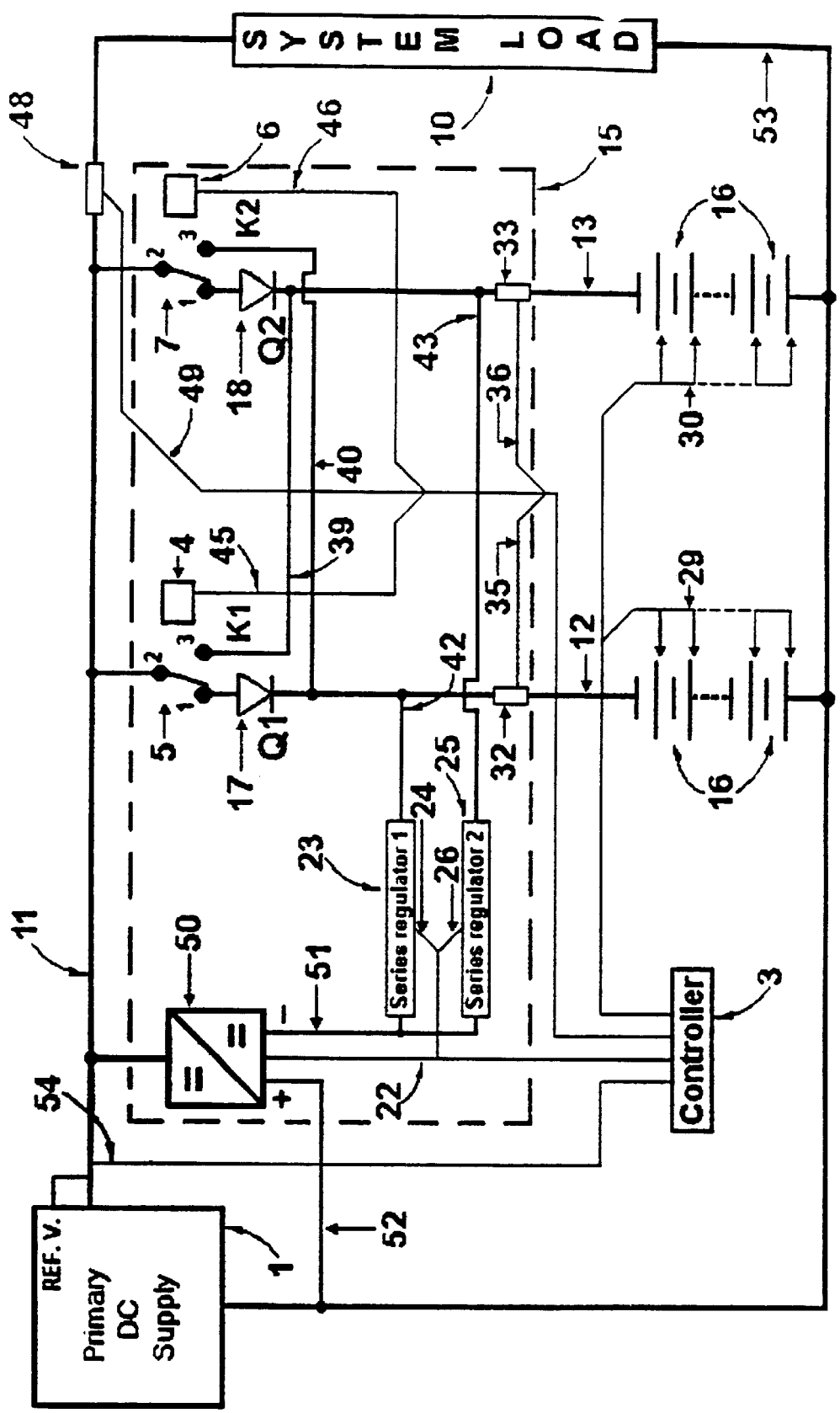
FIG. 2 is a schematic block diagram of the Automatic Battery Charging (ABC) System.
Figure 3:
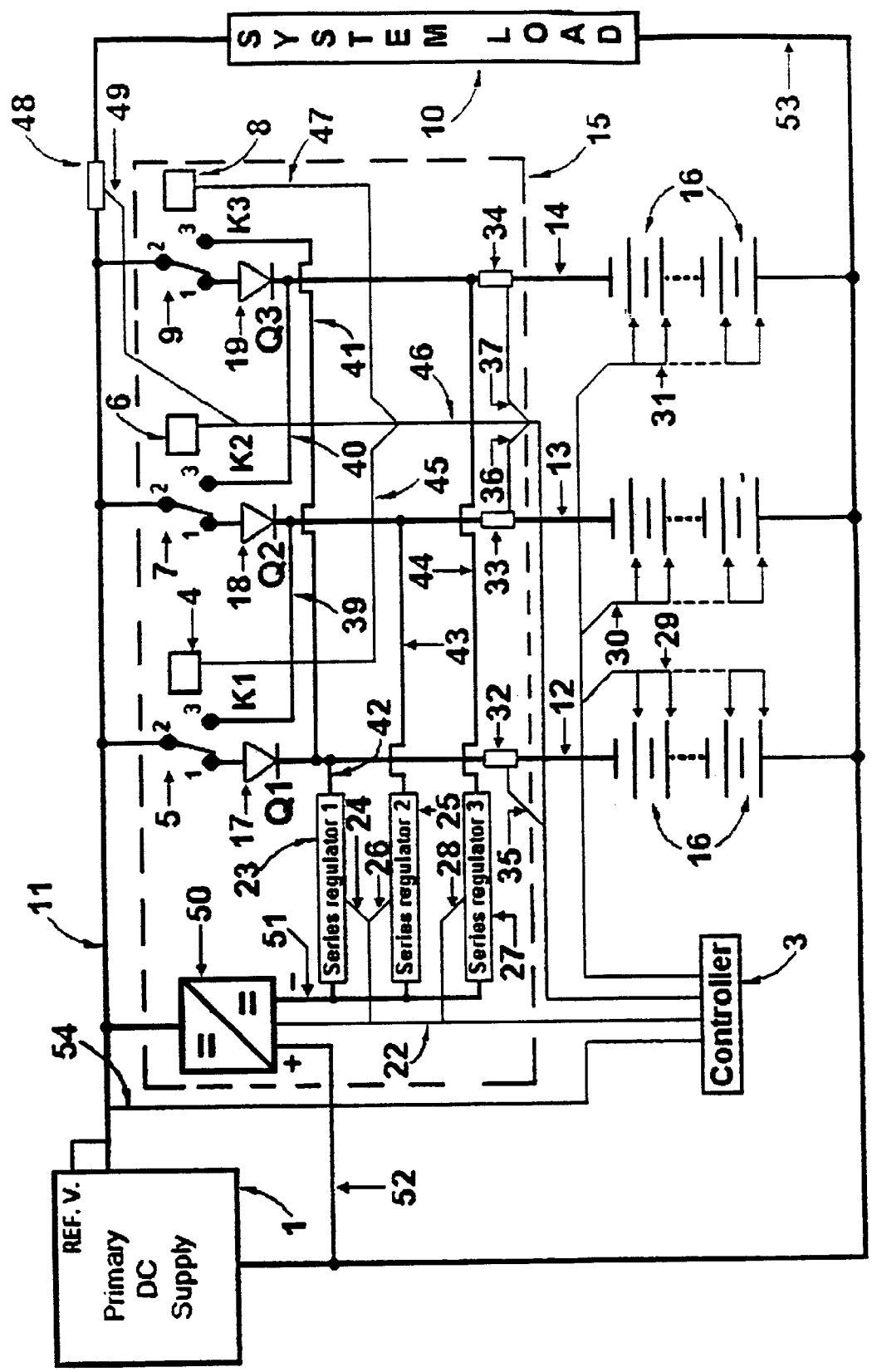
FIG. 3 is a schematic block diagram of the Automatic Battery Charging (ABC) System.

FIG. 3 shows the preferred embodiment of the ABC System invention, as it would appear with a third added battery string 14. It is otherwise essentially the same as FIG. 2.

In FIG. 2, showing the preferred embodiment of the ABC system invention, a primary DC source 8 supplies DC power to a system load 10 through a system load bus 11. The primary DC source 8 may comprise a conventional system for developing rectified DC power from a commercial source of AC power. A system for use in a telephone switching office may employ a bank of battery strings. In the illustrated embodiment, two exemplary strings of battery are shown schematically at 12 and 13. In a typical installation, each battery string 12 and 13 comprises a number of cells or group of 6 cells (termed mono-blocks) 16 herein sometimes referred to as "cells/ mono-blocks." As shown each cell may produce for example, −2.25Vdc. In a bank of 24 cells on float charge, a total voltage level approximating a value of −54Vdc is developed.

Basic components of the ABC System according to the present invention are contained within the battery string module 15. An important component of the battery string module 15 is the high isolation impedance diodes 17 and 18. Diodes 17 and 18 are connected in series with the battery strings 12 and 13 (as used herein, the terms "battery" and "battery string" are used interchangeably to mean any series of battery cells, regardless of their particular construction). The function of the isolation impedance means (here shown as diodes 17 and 18) is to electrically isolate the battery strings 12 and 13 from the system load bus 11. As will become evident from the ensuing description, having the battery strings 12 and 13 isolated from the system load bus 11 provides a variety of benefits not available to back-up battery management or monitor systems in which the battery strings are placed directly across the load. As explained above, placement of the battery strings across the load and in parallel, sets up conditions for thermal runaway, accelerated positive grid corrosion and electrolyte dry-out in VRLA batteries, It also establishes conditions for performance and reliability degradation in batteries of other types.

As will be explained in the following text, the present ABC System invention makes possible: The controlled charging of the battery strings at a rate that is constant at a given time and for a given condition of the battery cells/mono-blocks 16; The avoidance of the potential for thermal runaway; and Negation of performance and reliability degrading problems that plague prior monitor systems.

Further, these benefits are achieved without depriving the individual battery strings 12 and 13 from supplying emergency DC power instantaneously to the System load 10. Emergency power is supplied in the event of an AC power outage or any other consequential drop in the primary DC source 8 output voltage level.

Any of a number of circuit structures and components may be employed to implement the high isolation impedance means needed in order to remove the batteries 12 and 13 from the influence of the system load bus voltage 11. In the preferred illustrated embodiment, the diode and shunting relay sets Q1, K1 and Q2, K2 are employed to isolate the batteries 12 and 13 from the load bus voltage 11.

The shunting relay sets K1 and K2 are the normally closed relays 4 and 6. The relays 4 and 6 actuate a set of switch contacts 5 and 7 respectively when the relays are energized. Further, these relay sets are connected in parallel with the Diodes 17 and 18 and wired to operate as follows: When energized, the switch contacts 5 and 7 have their individual contacts 1 and 3 shorted by the switch contacts' wiper. This condition places the diodes 17 and 18 in series with and between the negative output wiring of the battery strings 12 and 13 and the wiring to the load bus 11; The switch contact 5 has its contact no. 2 wired via lead 39 to the cathode of the diode 18. Therefore, when the relay 4 is de-energized, the battery string 13 is placed directly unto the load bus 11; The switch contact 7 has its contact no. 2 wired via lead 40 to the cathode of the Diode 17. Therefore, when the relay 6 is de-energized, the battery string 12 is placed directly unto the load bus 11.

The shunting sets K1 and K2 have break-type normally closed contacts. This feature allows connecting the battery strings 12 and 13 to the system load bus 11 in the event that the contactor sets K1 and K2 or their control fails (FIG. 2 shows the relays 4 and 6 in the energized condition).

In accordance with an important aspect of the present invention is a buck/boost power converter 50, receiving its input power 51 from the load bus 11. It supplies negative DC power 52 to the series regulators 23 and 25 that are in series with the battery strings 12 and 13. It provides a constant maintenance or "float" current to float charge the battery strings 12 and 13. The converter 50 may be of conventional construction and with the addition of series regulators 23 and 25, makes possible the application of a constant voltage across the battery cells/mono-blocks. The series regulators 23 and 25 control the voltage level and current to the batteries 12 and 13. The float current levels are dependent upon the type, size and age of the battery. The battery strings 12 and 13 are connected to the system load bus 11 through the diodes 17 and 18 for all conditions when the primary DC source 8 is unable to supply the system load current. It should be noted that float charging at a constant voltage level with current limits prevents damage to the battery cells through thermal runaway or meltdown, as was explained above.

In accordance with another feature, a controller 3 performs monitoring and control functions in the ABC system of the present invention. The controller 3 monitors via leads 29 and 30, the voltage of each battery string 12 and 13. Battery string current through the shunts 32 and 33 is measured via leads 35 and 36 from the controller 3. The system load 10 current through shunt 48 is measured via lead 49 from the controller 3. The relay sets 4 and 6 are energized or de-energized via the signal leads 45 and 46 respectively from the controller 3. Also, the output voltage of the buck/boost converter 50 can be adjusted via the signal lead 22 from the controller 3. The series regulators 23 and 25 can be adjusted via control leads 24 and 26 respectively from the controller 3. And last but most importantly, the load bus 11 voltage level is monitored constantly by dual monitor circuits located on the control card circuit board 3 via the monitor lead 44.

The operation of the system according to the present ABC System invention will now be described.

The ABC System of the present invention provides a means to control the factors that influence the life of a VRLA battery or batteries of other types. Controlling and managing the way a VRLA battery is charged, with particular attention to the float, boost and temperature compensation methods of charging VRLA batteries, will help maximize their useful life. Further, the present ABC system provides the means for testing a string or strings of VRLA batteries while monitoring cell voltages. This obtains accurate information regarding both a battery's health and state of readiness (capacity). Also, the ABC system is designed so that any failure mode affecting the ability of the system load bus 11 to sustain the system load 10 will immediately return the power system to a standard rectifier/battery/load parallel configuration. During normal operation, the primary DC source 8 supplies all load current via the system load bus 11 to the system load 10. The VRLA battery strings 12 and 13 are connected to the system load bus 11 but displaced/blocked by the high impedance means of the diodes 17 and 18. The diodes 17 and 18 provide an approximate 0.7–0.8 forward voltage drop. This effectively removes the battery strings 12 and 13 from the influence of the Primary DC source 8 voltage.

During float charge operation (the predominate mode of operation for communications batteries), the buck/boost power converter 50 provides a predetermined substantially constant voltage via 52 to the series regulators 23 and 25. The current necessary to float charge the battery strings 12 and 13 is regulated via feedback circuitry using control leads 24 and 26 to the series regulators 23 and 25. The current level supplied is dependent upon the type, size and ages of the VRLA batteries. Also and as noted, the float charging current is substantially constant at a given time and for a given condition of the battery cells/mono-blocks. The current levels may differ for different times, temperatures and battery conditions.

While maintaining the battery strings 12 and 13 on float charge, a command signal from the ABC Systems' controller 3 can be sent to increase the float current output to a higher boost amount. Like the float charging current, the boost charging current is constant at a given time and for a given condition of the battery cells/mono-blocks. However, it can differ for different times, temperatures and battery conditions. It will also differ depending on the size and ages of the VRLA batteries. In practice, the substantially constant charging current (float and boost) delivered to the battery strings 12 and 13 is determined by testing. At the direction and under the control of the controller 3, the battery cells/mono-blocks 16 can be individually tested. The controller 3 determines for a given application of charging current, or a given period of time, an optimum level of current which will cause the battery cells/mono-blocks 16 to deliver optimum performance over a maximum predicted life. The testing of the battery cells/mono-blocks 16 may include impressing across the individual cells/mono-blocks a constant voltage that would be equal to the primary source 8 voltage. To accomplish this, the battery string 12 or 13 is put directly unto the load bus 11. The cells/mono-blocks 16 are allowed to settle at the imposed voltage level and are then measured via monitor leads 29 or 30 by the controller 3 to determine if an out of tolerance condition exists. This test is performed periodically at the discretion of the maintenance manager. This test is most appropriately performed just prior to the battery strings 12 and 13 scheduled boost charge. If no serious out-of-tolerance conditions are exhibited, the boost charge is only applied to one individual battery string 12 or 13 at a time.

The boost charge is applied to battery string 12 as follows: The controller 3 sends a signal via signal lead 26 to the series regulator 25 to decrease its output current to zero. Next, the battery string 13 is placed directly on the load bus 11 via a command signal 45 from the controller 3 to de-energize the K1 relay 4. This action by the controller 3 places the battery string 13 directly on the load bus 11 and removes the battery string 12 from the load bus 11 entirely. Now the controller 3 signals the buck/boost converter 50 via signal lead 22 to increase the output voltage level 52 by an amount equal to the predetermined boost voltage limit increase desired for battery string 12. The controller signals the series regulator 23 via signal lead 24 to increase the regulated current output of the series regulator 23 to 2 amps. The voltage level of battery string 12 now begins to increase in response to the increased amperage flow through the cells of battery string 12. The series regulator 23 has been voltage limited by a signal from the Controller 3 via signal lead 24. Hence, the voltage level of battery string 12 can only increase to a predetermined value. The boost current of 2 amps originally impressed on the battery string 12 by the series regulator 23, now decreases to a level needed in order to maintain the battery string 12 at the predetermined boost voltage level. After one and one half-hours have elapsed, the controller 3 sends a voltage adjustment signal via signal lead 24 to the series regulator 23. This signal decreases the voltage limit output of the series regulator 23 from a predetermined boost voltage limit to a predetermined float voltage limit. The controller 3 also signals the buck/boost converter 50 via signal lead 22 to decrease the output voltage level 52 by an amount equal to the predetermined boost voltage limit increase used for battery string 12. Next, the battery string 13 is removed from the influence of the load bus 11 voltage via a command signal 45 from the controller 3 to energize the K1 relay 4. This action by the controller 3 places both the battery strings 12 and 13 into a blocked condition in series with the diodes 17 and 18. This condition allows the battery strings 12 and 13 access to the load bus 11 but removes them from the influence of the load bus 11 voltage. The controller 3 sends a signal via signal lead 26 to the series regulator 25 to increase its output current and continue the predetermined float output voltage limit.

The frequency of occurrence of a command signal from the Controller 3 that initiates the boost charge is determined in either of two ways: By battery measurements taken periodically (every 24 hours for example) while on float charge. During this period, VRLA battery cell/mono-block 16 voltages are monitored by the ABC System controller 3 to insure that the cells/mono-blocks 16 are within a pre-specified voltage tolerance range. If a group of either 6 cells or a mono block exceeds that range, a boost charge of the associated battery string 12 or 13 is commenced. Note: In this instance, the ABC System can only boost charge one full battery string 12 or 13 at a time. Entire battery string 12 and 13 boost charging (as described previously), takes place at regularly scheduled intervals such as every one or two months.

In the second instance, to insure that the cells/mono-blocks 16 are properly accepting the higher charge current, the controller 3 monitors the cells/mono-blocks 16 voltages as they are being boost charged. The alternative boost charge, which occurs as needed (as determined by periodic battery parameter measurements), insures that both the positive and negative plates of the battery cells/mono-blocks 16 are polarized. Boost charging insures that the cells/mono-blocks 16 are fully charged and hence, in a fully recombinant state. This minimizes cell "dry out" (water loss), and adds to the useful life of the VRLA battery cells.

When the ABC System is operating in a normal Float charge mode, and the primary DC power source 8 is unable to supply the total load current, the system load bus 11 voltage begins to decay. A dual voltage monitor detector circuit (here for convenience is considered part of the controller 3), detects any voltage drop of the system load bus 11. The battery strings 12 and 13 are instantaneously connected to the system load bus 11 via the diodes 17 and 18 that begin to conduct current from the batteries 16 when the load bus 11 voltage decay exceeds 0.7 to 0.8Vdc.

The closure of the contacts 1 and 3 of the K1 and K2 shunt relay sets 4 and 6 takes place less than 1 second after the initiation of the decay of the system load bus 11 voltage. The transition of battery power to the system load bus 11 is smooth and without interruption. Throughout all battery discharges, including emergency discharges, the ABC System controller 3 is constantly monitoring the battery strings 12 and 13 voltage to determine the remaining system reserve capacity. Individual cell/mono-block 16 voltages are also monitored and the data is stored for later use to determine the health and reserve capacity of the individual cell/mono-blocks 16.

When the primary DC source 8 returns to operation, it again supplies all load current via the system load bus 11 to the system load 10. The K1 and K2 shunt relay sets 4 and 6 remain released (closed). This allows the primary DC source 8 constant voltage output to charge the battery strings 12 and 13. The K1 and K2 shunt relay sets 4 and 6 are not energized (opened) until the battery string charge current, as detected by the controller 3 falls below a predetermined level. At that time, the K1 or K2 shunt relay set 4 or 6 operates (opens) and its associated battery string 12 or 13 receives the remaining charge via the boost charge mode as previously described. Once properly charged, the battery strings 12 and 13 return to the float charge mode.

The actions of the controller 3 outlined above will now be described in more detail. Individually and for each item monitored, the control action of the controller 3 will be described.

System load bus 11 voltage: The controller 3 continuously monitors the system load bus 11 voltage via the monitor lead 44 and uses the data derived as follows: During emergency discharges the controller 3 calculates remaining back-up battery capacity. Dual monitor circuits detect a voltage decrease and the controller 3 de-energizes the shunting relay sets 4 and 6, placing both battery strings 12 and 13 directly onto the load bus 11.

Battery strings 12 and 13 voltages: The controller 3 monitors the battery strings 12 and 13 voltages during an emergency discharge, using the data derived together with the batteries discharge current measurements to calculate the battery strings' predicted capacity.

Battery cell/mono-block 16 voltages: The controller 3 monitors battery cell/mono-block 16 voltages continuously and uses the data as follows: To detect a battery cell/mono-block 16 voltage that is out of tolerance. During an emergency discharge, the controller 3 stores the data for future retrieval to determine the battery cell/mono-block's 16 state of health and capacity.

Battery strings 12 and 13 current measurements: The controller 3 measures the battery strings 12 and 13 current levels via monitor leads 35 and 36 to current shunts 32 and 33 respectively during battery discharge and recharge. The controller 3 uses this information to determine: If the battery strings 12 and 13 are sharing the system load 10 properly during a discharge. When the shunt relay sets 4 and 6 should be energized (opened) following a recharge. When a predetermined current level is satisfied, the buck converter 50 is then used to finish charging the battery strings 12 and 13.

System load current: The system load current level is continuously measured via the monitor lead 49 from the controller 3 to the system load shunt 48. This data is used during an emergency discharge as follows: Together with the load bus 11 voltage, it is used to calculate the remaining back-up battery capacity. To determine that the battery strings' 12 and 13 current levels are sharing the system load 10 properly.

Temperature in the vicinity of battery strings 12 and 13: Ambient temperature in the near vicinity of the battery strings 12 and 13 is continuously measured via monitor leads 35 and 36. The controller 3 uses the temperature measurements as follows: As an aid to verify that a rise in the battery strings' 12 and 13 current is due to temperature increases only. Help calculate what temperature compensation changes might be needed to adjust the battery strings' 12 and 13 float current limit value (i.e., to increase or decrease the float current limit value).

Shunt relay sets 4 and 6 (K1 and K2): The controller 3 energizes or de-energizes the relays 4 and 6 under the following circumstances: If the controller's 3 dual circuit voltage monitors detect a decay in the load bus 11 voltage exceeding 0.7Vdc, both relays 4 and 6 are sent a command via leads 45 and 46 from the controller 3 to de-energize. During recharge of the battery strings 12 and 13, the controller 3 detects that a predetermined current level of charge to either battery string 12 or 13 has been satisfied. In that instance, the controller 3 sends the appropriate relay 4 or 6 a signal via lead 45 or 46 to energize. When a boost charge of either or both battery strings 12 or 13 is to be initiated, the controller 3 sends a signal via lead 45 or 46 to the appropriate relay 4 or 6 to energize. Note: During boost charge, only one relay 4 or 6 is de-energized at a time. This is because the ABC system dictates that only one battery string 12 or 13 can be off-line at any given time. In case of an emergency AC outage, both relays 4 and 6 are de-energized and the boost charge is suspended.

Buck converter 50: The controller 3 sends signals via lead 22 to the buck converter 50 to initiate the following actions: The controller 3 chooses one out of the three output voltages the buck converter 50 can generate. The controller 3 can signal the buck converter 50 to turn ON or OFF. Series regulators 23 and 25: The controller 3 can adjust the voltage and current limit settings of the series regulators 23 and 25 via control leads 24 and 26 respectively. Note: Voltage and current limits placed on the output of the Series Regulators 23 and 25 prevent the battery strings' 12 and 13 cells/monoblocks 16 from obtaining excessive amounts of current during charge periods.

The above-described embodiment is merely illustrative of the many possible specific embodiments that represent applications of the present invention. Numerous and varied other arrangements can readily be devised following the principles of the invention without departing from the spirit and scope of the invention. For example, whereas the controller 3 has been described as being remote from the ABC system, to protect the power supply system from a failure occurring in the controller 3, a number of the monitoring and control functions e.g., control of the shunt relay sets K1 and K2 and the buck converter 50 to name just two control functions, may be incorporated in a local controller (preferably located in the battery string module 15) forming part of the ABC System.

Whereas the invention has been described in a VRLA battery application, the principles of the invention may be employed with flooded lead acid batteries and rechargeable batteries of other types.

What is claimed is:

1. A battery management system for a battery connected to a load bus wherein the load bus is further connected to a primary DC source, comprising:

variable isolation impedance means having high reverse impedance and variable forward impedance connected in circuit with said battery for electrically isolating said battery from said system load bus without loss of battery back-up capability;

control means coupled to the variable isolation impedance so means for controlling the forward impedance of the variable isolation impedance means in dependence upon a sensed condition; and shunt and connecting means responsive to said control means for selectively connecting said shunt across said variable isolation impedance means to selectively connect said battery to said load bus.

2. The system defined by claim 1 wherein said variable impedance means comprises a gated silicon controlled device controlled by said control means.

3. The system defined by claim 2 wherein during recharges of said battery after an emergency discharge into said load, said control means maintains said shunt across said variable impedance means until the charging current falls to a pre-determined charging current level, and thereafter adjusts the connecting means to disconnect the shunt to electrically isolate said battery from said primary DC supply voltage.

4. A battery management system for use with a primary DC source that supplies a primary DC supply voltage to a system load bus, said primary DC source having a parallel back-up battery comprising:

control means for sensing battery and system conditions and for supplying control signals to components of the battery management system;

an isolation impedance circuit connected with said battery and responsive to said control means for selectively isolating said battery from said system load bus without loss of battery back-up capability;

wherein said isolation impedance circuit comprises an SCR connected in parallel with a controlled switch, said controlled switch having a first state wherein said controlled switch shunts said SCR to connect said battery to said system load bus; and battery charging means for supplying a charging current to said battery while said battery is isolated from said system load bus by said isolation impedance circuit.

5. The system defined by claim 4 wherein the charging current is substantially constant at a given time and for a given condition of the battery.

6. The system defined by claim 5 wherein said battery charging means responds to commands from said control means to develop a substantially constant float current and a substantially constant boost current, said float current being lower than said boost current.

7. The system defined by claim 5 wherein said SCR is controlled by said control means.

8. The system defined by claim 6 wherein said SCR has variable forward impedance and wherein said control means adjusts the forward impedance of said SCR to a first level when said battery charging means is supplying said float current, and to a second level when said battery charging means is supplying said boost current, said second level being higher than said first Level.

9. The system defined by claim 4 wherein said battery is a valve-regulated lead acid battery.

10. A battery management system for use with a primary DC source which supplies a primary DC supply voltage to a system load bus for use by a load, and which primary DC source has a parallel back-up battery having a battery output voltage, the back-up battery comprising:

control means for sensing battery and system conditions and for supplying control signals to components of the battery management system;

isolation impedance means connected in series with said battery and responsive to said control means for selectively isolating said battery from said system load bus without loss of battery back-up capability; and test discharge means adapted to be connected in series with said battery and said system load bus in response to control signals from said control means for developing a predetermined test voltage;

wherein the sum of said predetermined test voltage and the battery output voltage being effective to discharge a test current into the load, whereby said battery may be discharge tested while in a ready state in said system.

11. The system defined by claim 10 wherein said isolation impedance means includes a gated silicon controlled device controlled by said control means.

12. The system defined by claim 11 wherein said battery is a valve-regulated lead acid battery.

13. A method of recharging a parallel battery in a back-up battery system after a drop in the primary supply voltage has caused the battery to be discharged into the load and after the primary supply voltage has been restored across the load and battery, the method comprising the steps of;

monitoring the flow of battery charging current being delivered into the battery from the primary supply voltage restored across the battery responsive to the flow of battery charging current;

applying the primary supply voltage across the battery until the level of battery current charging falls to a predetermined first charging current level responsive to attaining said predetermined first battery charging current level;

electrically isolating the battery from the primary supply voltage without loss of battery back-up capability;

delivering into the battery a current at a predetermined second current level lower than said first battery charging current level until the voltage across the battery rises to a predetermined first battery voltage level and responsive to the attainment of said predetermined first battery voltage level; and delivering into the battery a current at a predetermined third current level lower than said second current level.

14. The method defined by claim 13 wherein the charging current is substantially constant at a given time and for a given condition of the battery.

15. The method defined by claim 14 wherein said isolating of the battery from the primary supply voltage is achieved by providing a high impedance in series with said battery.

16. The method defined by claim 15 wherein said high impedance is a gated silicon device, and wherein a gate input to the gated silicon device is responsive to the primary supply voltage applied across the load.

17. The system defined by claim 16 wherein said battery is a valve-regulated lead acid battery.

18. A battery management system for a battery connected to a load bus wherein the load bus is further connected to a primary DC source, comprising:

a variable isolation impedance circuit connected in circuit with said battery for selectively isolating said battery from said system load bus without loss of battery back-up capability, wherein said isolation impedance circuit comprises an SCR connected in parallel with a controlled switch, said SCR having a high reverse impedance and a variable forward impedance said controlled switch having a first state in which said controlled switch shunts said SCR to connect said battery to said system load bus; and control means coupled to the variable isolation impedance for controlling the forward impedance of the SCR and the state of the controlled switch in dependence upon a sensed battery condition or parameter.

19. The system defined by claim 3 wherein when the charging current falls to the predetermined charging current level, the control means adjusts said variable forward impedance to a higher level.

20. A charging and monitoring apparatus for use with a battery employed as a back-up power supply to a primary source of power the primary power source including a load bus for delivering power the apparatus comprising:

a battery module in circuit with the battery for selectively supplying charging current thereto, the battery module being in circuit with the load bus and including an isolating impedance circuit having a variable impedance for selectively isolating the battery from the load bus of the primary power source;

a discharge module for testing the health of the battery by selectively discharging the battery to the load bus; and a controller in circuit with the battery module and the discharge module for controlling the operation thereof.

21. An apparatus as defined in claim 20 wherein the battery module includes a power converter for selectively supplying the charging current to the battery the power converter being responsive to the controller to adjust the level of the charging current supplied to the battery.

22. An apparatus as defined in claim 20 wherein the isolation impedance circuit comprises an SCR and a controlled switch, the controlled switch being connected in parallel with the SCR to selectively form a shunt across the SCR connecting the battery to the load bus.

23. An apparatus as defined in claim 22 wherein the SCR has a high reverse impedance, a first forward impedance, and a second forward impedance wherein the second forward impedance is higher than the first forward impedance.

24. An apparatus as defined in claim 23 wherein the controller causes the controlled switch to form the shunt across the SCR in the event of a failure of the primary power source.

25. An apparatus as defined in claim 24 wherein the controller switches the SCR to the second forward impedance in the event of a failure of the primary power source.

26. An apparatus as defined in claim 22 wherein during recharge after the battery has been at least partially discharged, the controller causes the controlled switch to maintain the shunt across the SCR until the charging current falls to a predetermined charging level, and thereafter causes the controlled switch to change states to again electrically isolate the battery from the load bus.

27. An apparatus as defined in claim 20 wherein the controlled switch shunts the SCR and connects the battery to the load bus when a voltage of the load bus drops below a predetermined level.

28. An apparatus as defined in claim 20 wherein the discharge module comprises a power convener for developing a discharge voltage which, when summed with a voltage developed by the battery, discharges the battery into the load.

29. An apparatus as defined in claim 20 further comprising a controlled switch for selectively disconnecting the discharge module from the battery.

* * * * *